Figure 1:
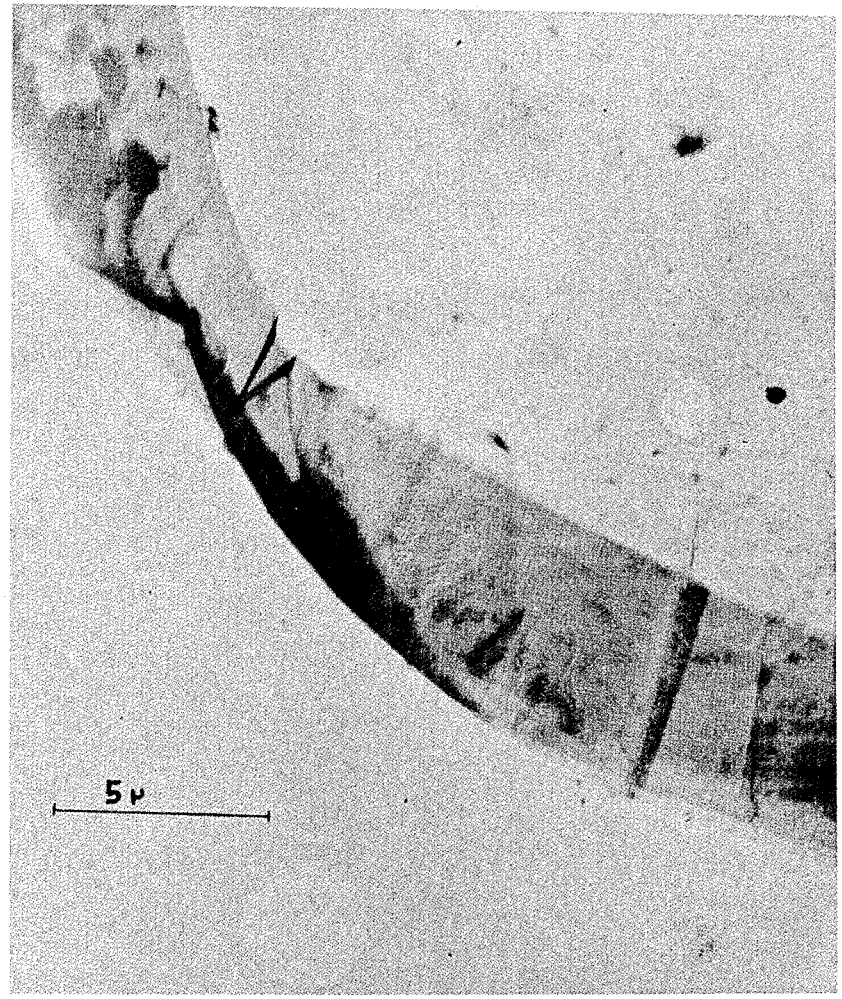

Oct. 25, 1960   R. BACON   2,957,756
FILAMENTARY GRAPHITE AND METHOD FOR PRODUCING THE SAME
Filed March 18, 1958   2 Sheets-Sheet 1

INVENTOR.
ROGER BACON
BY
ATTORNEY

United States Patent Office 2,957,756
Patented Oct. 25, 1960

2,957,756

FILAMENTARY GRAPHITE AND METHOD FOR PRODUCING THE SAME

Roger Bacon, Parma, Ohio, assignor to Union Carbide Corporation, a corporation of New York Filed Mar. 18, 1958, Ser. No. 722,281

2 Claims. (Cl. 23—209.2)

This invention relates to novel articles of manufacture consisting essentially of graphite filaments of unusually high tensile strength and conductivity. The invention is also concerned with methods for producing such articles.

Heretofore, graphite filaments have been produced by methods generally entailing the decomposition of various hydrocarbons onto heated graphite or carbon material. Graphite filaments thus produced are short, thick, brittle, polycrystalline filaments of irregular outline and unpredictable properties. As a result, such filaments find very little use in industry in contrast to what one might reasonably expect, knowing the many industrial uses of graphite articles.

With a view to departing from prior art techniques for producing filamentary graphite, the main object of this invention is to provide a novel method for producing graphite filaments of useful and unusual properties.

Figure 2:
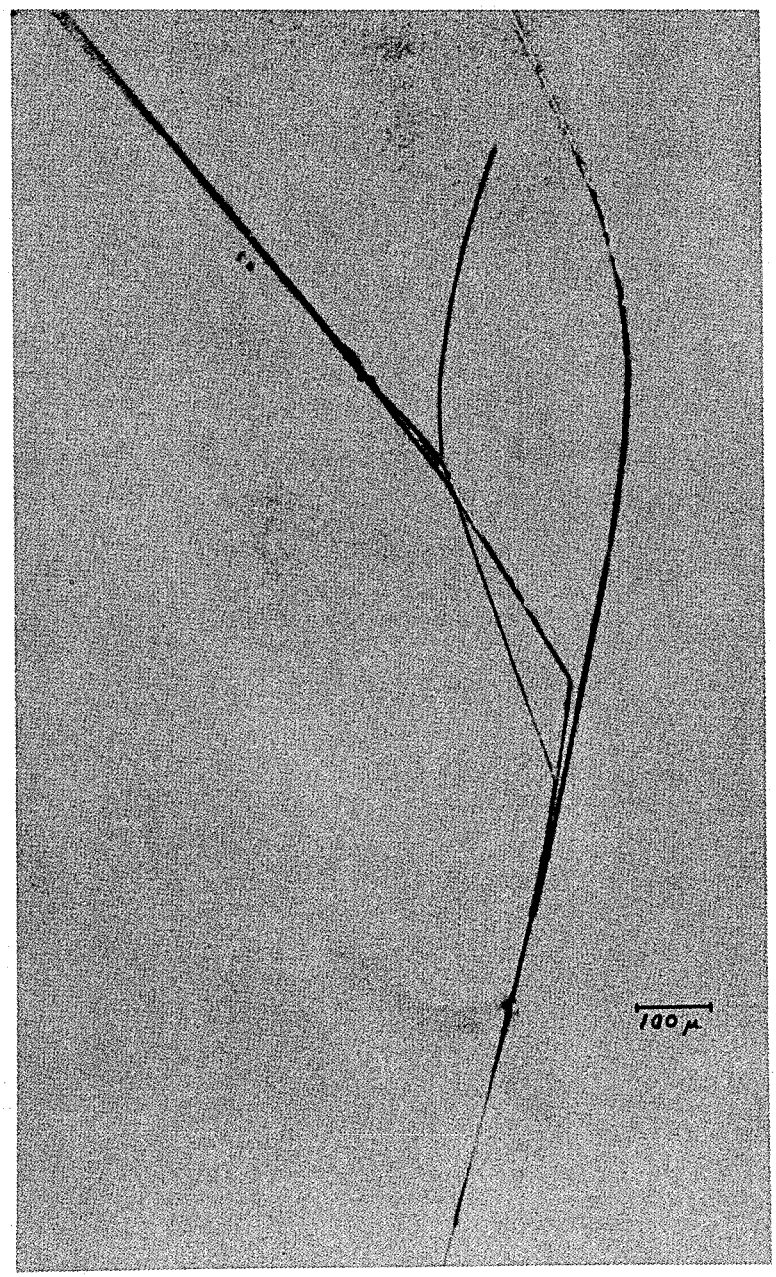

In the drawings:

Fig. 1 is an electron micrograph showing a ribbon shaped graphite filament enlarged 7,000 times; and Fig. 2 is a photomicrograph of a bundle of graphite filaments enlarged about 100 times.

The method of the invention comprises confining in a closed pressure vessel having means for introducing inert gases therein, a graphite or carbon rod over a carbon block. While maintaining the pressure in the system between 1150 p.s.i. and 1400 p.s.i., a direct current arc is struck between the rod and block, so that the temperature reaches a range of 3500 to 4000 degrees Kelvin. The electrode vapor from the rod condenses on the block forming a fast-growing, stalagmite-like boule or matrix of high density (about 2.0 gms./cm.$^3$) graphite in which are embedded a large number of fine graphite filaments.

The filaments are extracted from the graphite matrix by breaking the matrix, the filaments then appearing at the fractured surfaces as if growing out from the surface like whiskers. In the course of fracture, the filaments are pulled out of the body of their graphite matrix.

The pressure range above indicated for the formation of whiskers is critical. At pressures above 1470 p.s.i., the triple point of graphite, an elongated boule is built up from a pool of molten graphite which exists as a bridge between the rod and the top of the boule. The boule contains highly crystalline graphite, with a needle-like structure that is easily visible to the naked eye, the needles being aligned in the direction of the maximum temperature gradient. A high degree of preferred orientation is observed to exist in which the c-axis (the direction perpendicular to the layer planes in the graphite structure) tends to be perpendicular to the filament axis. As the pressure is lowered slightly below the triple point, but above 1400 p.s.i., melting is no longer possible, and the boules are built up by vapor deposition, maintaining, however, very similar appearance and properties to those grown above the triple point.

Further decrease of pressure to the range of 1150 to 1400 p.s.i. results in a boule that has still smaller grain size and a pronounced layer structure perpendicular to the temperature gradient. The filaments of the invention are embedded in these boules with their long axes parallel to the thermal gradient. The preferred conditions for whisker growth when using ½ inch diameter graphite rod are approximately 1300 p.s.i. argon pressure with the arc operating at approximately 80 volts and 80 amperes. As the pressure is lowered still further, the crystallinity continues to decrease until at around 800 p.s.i. the grain structure is suppressed altogether, and the layer structure once more disappears. No whiskers are observed to grow under conditions other than those indicated above.

A specific example of the practice of the invention follows.

Example I

A rod of artificial graphite ½ inch in diameter was inserted in a pressure vessel of stainless steel, provided with a cover and with an inlet in the cover to permit the introduction of an inert gas into the vessel. In the vessel were provided a carbon base block at the bottom thereof, a carbon crucible immediately above the block, and a carbon liner around the sides of the vessel. Above the crucible were positioned graphite radiation shields and spacers to impede the loss of heat from the crucible. A screw feed and an electrical lead pass through the cover of the vessel, the screw feed being in connection with the graphite rod to adjust the same within the crucible. The graphite block in the crucible was molded from a mixture of 80 percent artificial graphite and 20 percent carbon black, and bonded with carbonized coal tar pitch. Argon gas was introduced into the vessel, and at an argon pressure of 1360 pounds per square inch an arc was struck between the rod and the block by means of a direct current applied voltage of 80 volts at a current density of about 60 amperes per square inch. The arc was continued at a boule growth rate of 10 inches per hour for approximately 30 minutes. The material deposited on the carbon block in the form of a 6 inch boule was removed. The boule was secured to a support and twisted off therefrom. In this manner filaments were obtained ranging in length from 0.5 to 3 centimeters, and having diameters from below 0.5 micron to above 5 microns.

Examination of the properties of the filaments thus obtained indicate crystal perfection approaching that of single crystals. The tensile strength of the filaments was found to be about three million pounds per square inch with strains of approximately 0.4 percent. Other observed properties such as sharp Laue X-ray diffraction patterns, high optical reflectivity and low electrical resistance comparable to that of single crystal graphite indicate a high degree of crystal perfection for the filaments.

Observation has shown that the filamentary graphite produced by the method of the invention has a highly preferential orientation wherein the crystallographic c-axis is exactly perpendicular to the axis of the filaments.

Crystal perfection is inferred from the following observations:

(1) Room temperature resistivity ($6 \times 10^{-5}$ ohm-cm.) is comparable with that of single crystal flakes in the direction of the graphite layer planes.

(2) Sharp Laue X-ray diffraction patterns are observed, particularly for reflections from the layer planes.

(3) Sharp electron diffraction patterns showing a very few single crystal patterns which are related to one another by rotations about the c-axis have often been observed. However, such a multiple pattern remains unchanged as the "whisker" is translated along its length in the electron beam, which indicates a continuous layer structure along the length of the whisker. This implies a filamentary structure in which few faults are encountered as one proceeds along the length of the "whisker." Stacking faults encountered as one passes from plane to plane perpendicular to the axis of the filament are not ruled out, but these would have negligible effect on its longitudinal properties.

The high tensile strength is in part the result of the crystal perfection just discussed. It is, however, very probable that the structure of the whisker itself is responsible for the remarkable strength. This structure is characterized by a large length to diameter ratio, and by perfectly straight edges, with occasional step changes in diameter.

Direct evidence has been obtained confirming the hypothesis that the filaments or "whiskers" made in accord with the invention, consist of large graphite sheets rolled up into a tight tube. This is evidenced by the fact that the whiskers have been exploded yielding "fragments" of much larger diameter than that of the whisker itself. Much of the indicated data is evidenced in the accompanying illustration.

Fig. 1 is a photograph obtained by means of the electron microscope and showing a whisker consisting of layers of several graphite ribbons, and in Fig. 2 are visible branched whiskers, which actually are bundles of several filaments. These kink easily, but may be mechanically straightened.

Besides argon, the other inert gases, for example helium, neon, xenon and krypton can be used in the method of the invention. It is necessary only that the gas employed be incapable of reacting with the carbon or graphite at the temperatures and pressures involved in the method of the invention to an extent that would prohibit the formation of a liquid or gaseous carbon. Similarly, heating can be achieved in any of various ways, such as heating by radiation, induction heating, electron bombardment or resistance heating.

The graphite filaments of the invention are useful in a number of applications. They can be used as galvanometer suspensions, as low or high temperature resistance thermometers, as electrical filaments for either fine line light source or as vacuum tube filaments or as grids. Treated with boron, the filaments are suitable as thermocouples.

What is claimed is:

1. A method for producing filamentary graphite comprising confining in a closed pressure vessel having means for introducing inert gases therein a graphite rod surmounting a carbon block, striking a direct current arc between said rod and block while maintaining the pressure in said vessel between 1150 p.s.i. and 1400 p.s.i., to effect vaporization from said rod onto said block in the form of a boule, cooling said boule, fracturing said boule and removing graphite filaments embedded therein.

2. Substantially noncrystalline filamentary graphite characterized by a highly preferential orientation wherein the crystallographic c-axis is exactly perpendicular to the axis of the filament, and a tensile strength of about three million pounds per square inch, and consisting of axially continuous sheets of graphite having an extension perpendicular to the filament axis ranging from 0.1 micron to 10 microns.

References Cited in the file of this patent

UNITED STATES PATENTS

| | | |
|---|---|---|
| 2,635,994 | Tierman | Apr. 21, 1953 |
| 2,796,331 | Kauffman et al. | June 18, 1957 |
| 2,822,321 | Pickard | Feb. 4, 1958 |

OTHER REFERENCES

Davis et al.: "Nature," 171, 756 (1953).
Caney et al.: "The Electrochemical Society," preprint 67–18, March 25, 1935, pp. 209–211.

UNITED STATES PATENT OFFICE

CERTIFICATION OF CORRECTION

Patent No. 2,957,756                         October 25, 1960

Roger Bacon

It is hereby certified that error appears in the above numbered patent requiring correction and that the said Letters Patent should read as corrected below.

Column 4, line 18, for "noncrystalline" read -- monocrystalline --.

Signed and sealed this 25th day of April 1961.

(SEAL)
Attest:
ERNEST W. SWIDER
Attesting Officer

DAVID L. LADD
Commissioner of Patents